June 21, 1927.
H. A. LIENING
1,632,842
COMBINED DRINKING FOUNTAIN AND ANIMAL TROUGH
Filed Nov. 30. 1925
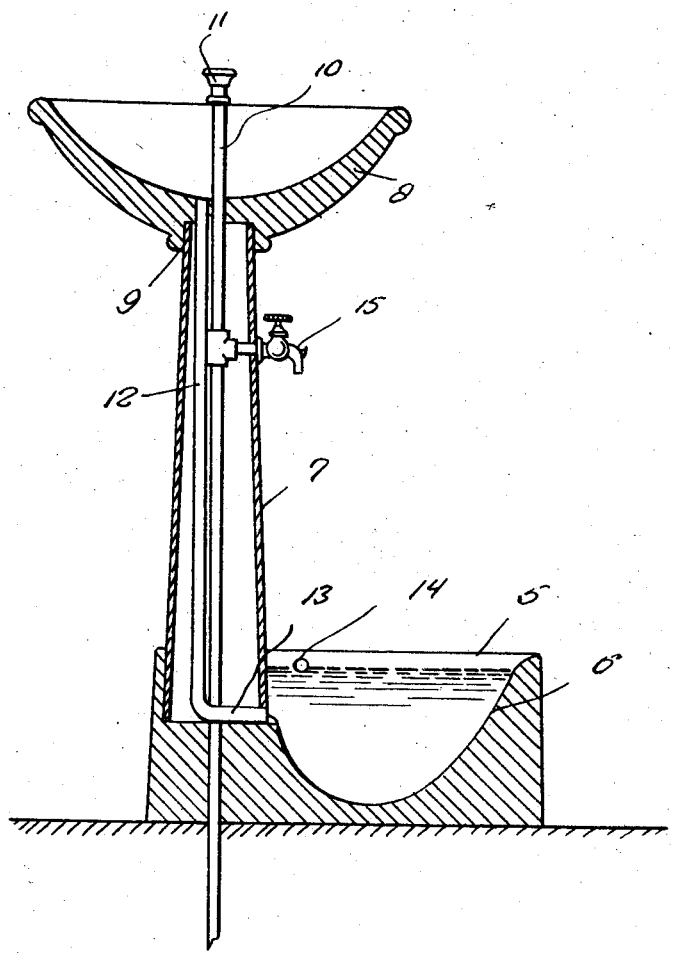
Inventor
H. A. Liening,
By Clarence A. O'Brien
Attorney Patented June 21, 1927.

1,632,842

UNITED STATES PATENT OFFICE.

HENRY A. LIENING, OF DETROIT, MICHIGAN.

COMBINED DRINKING FOUNTAIN AND ANIMAL TROUGH.

Application filed November 30, 1925. Serial No. 72,271.

This invention relates to a combined drinking fountain and animal trough, and has for its primary object to provide such a device wherein the waste water from the drinking fountain may be conveyed to the animal trough in order that horses, dogs and the like may at all times find a fresh supply of water and in order that cats, dogs and the like will be prevented from climbing up and drinking out of the fountain provided for humans, a procedure now followed by such animals insomuch as no supply is provided for them resulting in unsanitary conditions of the fountain and consequent non-use for the purpose installed.

A further and important object is to provide a combined drinking fountain and animal trough of this character that is of relatively simple nature, and that may be set up as a unit and that is of such construction as to provide an ornamental fixture for streets corners and other appropriate places.

With the foregoing and other objects in view as the nature of the invention will be better understood, from the following specification and accompanying drawing, the same consists of the novel form, combination and arrangement of parts.

In the drawing:

The figure is a detail vertical section of my improved drinking fountain and animal trough.

Now having particular reference to the drawing, my device constitutes the provision of a base 5 of suitable shape and material that is formed at its upper side with a water receving trough 6.

Set within said base 5 at the rear side of the trough 6 is a vertically extending tube 7 of metal or other desirable material that provides a support for a suitable shaped fountain bowl 8, the bottom wall of which is socketed at 9 for receiving the upper end of said tube 7.

Extending upwardly through the base 5, tube 7 and fountain 8 is a water supply pipe 10 that is equipped at its upper end with a conventional form of drinking nozzle 11, whereby the water from the pipe may be conveniently drunk by human beings. The waste water from the nozzle obviously falling into said fountain 8.

Leading from the bottom of the fountain 8 is a waste pipe 12 that extends downwardly through the tube 7 and thence laterally as at 13 into the base trough 6 in order that the waste water from the nozzle may be carried into said trough after which it may be conveniently taken by animals on the street, said trough 6 being provided with a discharge opening 14 that may be and preferably is, in communication with a waste pipe, not shown, that leads to the city sewerage system.

In order that water containers may be filled, there is provided upon the front side of the tube 7, a suitable faucet 15 that is in communication with the supply pipe 10.

It will thus be obvious that I have provided a highly novel, simple and efficient construction of drinking fountain and animal trough that is well adapted for all of the purposes intended. Even though I have herein shown and described the most novel form of the invention with which I am at this time familiar, it is nevertheless to be understood that minor changes may be made in the invention without departing from the spirit and scope of appended claim.

Having thus described my invention, what I desire to secure by Letters Patent is:—

A combined drinking fountain and animal trough of the class described, comprising a base having a trough formed in its top side, a vertically extending tube having its lower end set within the base at the rear side of the trough, a fountain bowl, a socket formed on the bottom of said bowl, the upper end of said vertically extending tube being fitted in said socket for supporting the fountain bowl on the upper end of the tube, a water supply pipe extending vertically through the base, the tube, and the bowl. a drinking nozzle on the upper end of the pipe, an additional pipe arranged vertically within the tube, the upper end thereof communicating with the bottom of the bowl, the lower end of the pipe being disposed laterally for communication with the trough whereby the trough may be filled by the overflow from the nozzle which is discharged into the bowl, and a faucet associated with the water supply pipe and arranged on the outside of the vertical tube above the trough whereby the trough may be initially filled independently of the overflow from the aforementioned nozzle.

In testimony whereof I affix my signature.

HENRY A. LIENING.